US008278382B2

(12) United States Patent
Boucher et al.

(10) Patent No.: US 8,278,382 B2
(45) Date of Patent: Oct. 2, 2012

(54) METHOD FOR PREPARING A TRANSPARENT POLYMER MATERIAL INCLUDING MINERAL NANOPARTICLES WITH A SHAPE FACTOR STRICTLY HIGHER THAN 1.0

(75) Inventors: Virginie Boucher, Boulogne sur Mer (FR); Sophie Duquesne, Saint-André-Lez-Lille (FR); Serge Bourbigot, Villeneuve d'Ascq (FR); Didier Sy, Salin de Giraud (FR); Marc Lacroix, Louvain-la-Neuve (BE); Alexandra Roos, Charenton-le-Pont (FR); Nathalie Cornet, Voisins-le-Bretonneux (FR); Laure Meynie, Paris (FR)

(73) Assignees: Renault S.A.S., Boulogne-Billancourt (FR); Essilor International (Compagnie Generale d'Optique), Charenton Cedex (FR); Solvay SA, Brussel (BE)

( * ) Notice: Subject to any disclaimer, the term of this patent is extended or adjusted under 35 U.S.C. 154(b) by 0 days.

(21) Appl. No.: 13/130,677

(22) PCT Filed: Nov. 27, 2009

(86) PCT No.: PCT/FR2009/052320
§ 371 (c)(1),
(2), (4) Date: Aug. 8, 2011

(87) PCT Pub. No.: WO2010/066982
PCT Pub. Date: Jun. 17, 2010

(65) Prior Publication Data
US 2011/0281989 A1     Nov. 17, 2011

(30) Foreign Application Priority Data
Dec. 8, 2008    (FR) ..................... 08 58331

(51) Int. Cl.
*C08K 3/26* (2006.01)
*C08K 3/22* (2006.01)
*C08K 3/34* (2006.01)
*C08K 3/36* (2006.01)

(52) U.S. Cl. ........ 524/425; 524/430; 524/431; 524/432; 524/433; 524/445; 524/492; 524/493

(58) Field of Classification Search .................. 524/425, 524/430–433, 445, 492–493
See application file for complete search history.

(56) References Cited

U.S. PATENT DOCUMENTS

| 2002/0051862 A1 | 5/2002 | Ducros et al. |
| 2006/0058426 A1 | 3/2006 | Oda et al. |
| 2008/0081865 A1 | 4/2008 | Biswas et al. |
| 2008/0227901 A1 | 9/2008 | Lefevre et al. |

OTHER PUBLICATIONS

International Search Report dated Mar. 11, 2010.
Resin composition for molded product, comprises transparent resin and composite metal oxide particle containing metal oxide particle and metallic compound having refractive index varying from metal oxide particle.

*Primary Examiner* — Peter Szekely
(74) *Attorney, Agent, or Firm* — Sofer & Haroun, LLP

(57) ABSTRACT

The present invention provides a method of preparing a transparent polymer material, the method comprising steps i) and ii) in any order, the steps consisting in:
  i) mixing:
     mineral nanoparticles having a form factor strictly greater than 1.0; and
     a polymer matrix comprising a quantity of at least 80% by weight of a polycarbonate (PC) first thermoplastic polymer and of a second transparent thermoplastic polymer other than the first thermoplastic polymer, in order to obtain a mixture; and
  ii) heating the polymer matrix to the molten state, on its own or in the mixture;
to obtain the transparent, polymer material, the mixture of step i) comprising a quantity of mineral nanoparticles having a form factor strictly greater than 1.0 that is strictly less than 5% by weight.

26 Claims, No Drawings

METHOD FOR PREPARING A TRANSPARENT POLYMER MATERIAL INCLUDING MINERAL NANOPARTICLES WITH A SHAPE FACTOR STRICTLY HIGHER THAN 1.0

RELATED APPLICATIONS

This application is a National Phase application of PCT/FR2009/052320, filed on Nov. 27, 2009, which in turn claims the benefit of priority from French Patent Application No, 08 58331, filed on Dec. 8, 2008, the entirety of which is incorporated herein by reference.

BACKGROUND

1. Field of the Invention

The present invention relates to a method of preparing a transparent polymer material comprising a thermoplastic polycarbonate and nanoparticles having a form factor strictly greater than 1.0.

The invention applies typically, but not exclusively, to the fields of optics, in particular optical articles of the optical lens type for viewing instrumentation, a helmet visor, or an ophthalmic lens, and to optical articles of the automobile glass type.

More particularly, the term "ophthalmic lens" is used to designate lenses suitable in particular for fitting to an eyeglass frame and having the function of protecting the eye and/or correcting vision, such lenses being selected from afocal lenses, single-vision lenses, bifocal lenses, trifocal lenses, and progressive lenses.

The term "automobile glass" is used to designate not only transparent external bodywork elements such, for example, rear windows, quarter windows, side windows, glazed roofs, glass for headlights or indicator lights, but also transparent elements for inside the cabin, such as for example glass for the dashboard, for dials, or for screens.

2. Description of Related Art

Polycarbonate presents advantages that make it particularly advantageous for optics, in particular excellent transparency, excellent resistance to impacts, high refractive index, and great lightness. In contrast, as its main weak points, it is not very rigid and it is very sensitive to scratching and abrasion. In addition, the linear coefficient of thermal expansion (LCTE) of polycarbonate is relatively high, thereby running the risk of high levels of deformation in said polymer under the action of temperature.

In order to improve the mechanical properties of a polymer, in particular its rigidity and its ability to withstand abrasion and scratching, it is known to add mineral nanoparticles to the polymer, in particular mineral nanoparticles having a form factor that is strictly greater than 1.0.

An example of a method of incorporating such mineral nanoparticles is described in document. EP 1 632 536. Said nanoparticles are incorporated in a thermoplastic polymer matrix of the polycarbonate (PC) or polymethyl methacrylate (PMMA) type while in the molten state. In addition, it is also known that such nanoparticle incorporation may be performed in a mixture of polymers.

Nevertheless, when incorporating mineral nanoparticles in a thermoplastic polymer material or a mixture of polymers, the nanometric size of the mineral particles gives rise to a phenomenon of said nanoparticles aggregating. As a result, the resulting polymer material presents a loss of transparency, thereby making it difficult, if not impossible, to use in the fields of optics. In addition, incorporating mineral nanoparticles may give rise to a chemical degradation of the polymer material and thus of its mechanical properties, such as for example its ability to withstand impacts. It is also possible for coloring to appear, in particular yellowing.

OBJECTS AND SUMMARY

Relating more particularly to incorporating mineral nanoparticles in a polymer mixture, it is very difficult to find a good compromise between the refractive indices and/or the miscibility of the polymers making up said mixture, and thus be in a position to conserve satisfactory optical properties while also having high mechanical strength.

The object of the present invention is to mitigate the drawbacks of prior art solutions, in particular by providing a method of preparing a transparent polymer material, which method is easily industrializable and makes it possible to obtain a polymer material having improved mechanical properties and good optical properties.

The solution according to the present invention is to provide a method of preparing a transparent polymer material, characterized in that it comprises steps i) and ii) in any order, the steps consisting in:

i) mixing:
  mineral nanoparticles having a form factor strictly greater than 1.0; and
  a polymer matrix comprising a quantity of at least 80% by weight of a polycarbonate (PC) first thermoplastic polymer, and of a second transparent thermoplastic polymer other than the first thermoplastic polymer, in order to obtain a mixture; and
ii) heating the polymer matrix to the molten state, on its own or in the mixture;
in order to obtain the transparent polymer material, the mixture of step i) comprising a quantity of mineral nanoparticles having a form factor strictly greater than 1.0 that is strictly less than 5% by weight, and step i) not involving mineral nanoparticles in the form of a premixture obtained with a thermoplastic polymer in the molten state selected from polycarbonate (PC), polystyrene (PS), and polymethyl methacrylate (PMMA).

In other words, the subject matter of the method of preparation of the invention excludes any step consisting in initially making a premixture or master batch of mineral nanoparticles having a form factor greater than or equal to 1 with a thermoplastic polymer in the molten state selected from PC, PS, and PMMA, and then incorporating said premixture in the polymer matrix.

In the description below, certain terms are used as follows:
  "transparent polymer material", a material through which an image is observed without significant loss of contrast; in other words, interposing said transparent polymer material between an image and an observer of the image does not significantly reduce the quality of the image;
  "any order", the fact that step i) may be performed before, together with, or after step ii);
  "heating ( . . . ) to the molten state", raising the temperature to obtain a polymer matrix in a malleable state; this malleable state is well known to the person skilled in the art and may conventionally be reached when the polymer matrix is heated to a temperature higher than the vitreous transition temperature, or softening temperature, of the polycarbonate first thermoplastic polymer; by way of example, the matrix may be heated to about 260° C.; and "in a mixture" in step ii), the fact that the polymer matrix is heated to the molten state when it is in the mixture of step i), i.e. when step i) is performed either before or together with step ii).

Surprisingly, even though it is, a priori, problematic to work on the basis of polymer mixtures, in particular in the field of optics, for the reasons mentioned above (problems associated with refractive indices and/or miscibility), it has been found that the nanoparticles having a form factor strictly greater than in the present invention are better dispersed in such a mixture.

Furthermore, the lower limit of at least 80% by weight of thermoplastic polycarbonate in the polymer matrix makes it possible significantly to limit any excessive variation in the refractive index of the polymer material when the first and second polymers have refractive indices that are significantly different. Which degradation in optical properties would go against that which is necessary in an application of said polymer material, to mechanical optics.

Finally, this limit also makes it possible significantly to reduce the harmful effects of immiscibility, if any, between the first and second polymers, both in terms of mechanical properties, in particular in terms of rigidity and ability to withstand impacts, and in terms of optical properties, in particular the ability of the polymer material to transmit light.

Another advantage of the method of the invention is that it makes it possible to obtain a transparent polymer material that presents improved dimensional stability with temperature, and thus limited thermal expansion.

In a particular embodiment, said polymer matrix may comprise a quantity of at least 85% by weight of the polycarbonate first thermoplastic material, preferably a quantity of at least 90% by weight of said polymer, and more particularly a quantity of at least 95% by weight of said first polymer.

Furthermore, said polymer matrix may be constituted respectively by at least 80% by weight of the polycarbonate first thermoplastic polymer and at most 20% by weight of the second thermoplastic polymer, preferably at least 90% by weight of the polycarbonate first thermoplastic polymer and at most 10% by weight of the second thermoplastic polymer. In particularly preferred manner, it may be constituted respectively by 95% by weight of the polycarbonate first thermoplastic polymer and by 5% by weight of the second thermoplastic polymer.

In general, the form factor of a nanoparticle is the ratio between a certain "longest dimension" (L) of the particle, commonly referred to as its "length", and a certain "shortest dimension" (l) of the particle, commonly referred to as its "width" or "diameter".

The form factor is conventionally determined by analyzing images taken using a microscope, in particular an optical microscope, a scanning electron microscope (SEM), or a transmission electron microscope (TEM).

The "longest dimension" L of a nanoparticle is determined by analyzing microscope images by measuring
the maximum Feret diameter; or
the length of the rectangular parallelepiped in which the nanoparticle can be inscribed; or
directly measuring the length L.

The "shortest dimension" l of a nanoparticle is determined by analyzing microscope images by measuring:
the equivalent circular diameter; or
the minimum Feret diameter; or
the width of the rectangular parallelepiped in which the particle can be inscribed; or
directly measuring the width l.

The form factor L/l corresponds to a ratio between one length and one width associated by the above-mentioned definitions, i.e.:
a) the maximum Feret diameter over the minimum Feret diameter; or
b) the maximum Feret diameter over the equivalent circular diameter; or
c) the length of the rectangular parallelepiped in which the particle is inscribed over the width of the rectangular parallelepiped in which the particle is inscribed; or
d) the length as measured directly over the length as measured directly.

The mean form factor of a population of nanoparticles of the present invention is defined as the number average of the form factors of each of the nanoparticles taken individually, or in other words the number average of the ratio of the length L over the width l of each nanoparticle.

When the technique used is SEM, the sample of particles is initially dispersed in a solvent, and then it is typically placed on a silicon wafer.

When the technique used is TEM, the sample of particles is initially dispersed in a solvent, then it is placed on a copper grid covered in a film of transparent amorphous polymer such as vinyl polyformal.

The magnification is selected in reasonable manner, so that the particles are reasonably well defined and present in sufficient number. Under such conditions, analyzing a reasonable number of images, e.g. about twenty images, makes it possible to characterize the particles in a manner that is certain and reliable. When the magnification is too small, the number of particles is too high, so their level of aggregation is large and numerous particles run the risk, of being so small that each of them is represented by only a few pixels at this scale. When the magnification is too great, e.g. such that there are fewer than ten particles per image, it then becomes necessary to process a very large number of images, specifically several hundred images, in order to obtain morphological characteristics in a manner that is certain and reliable. Consequently, the image analysis method is selected in such a manner as to provide a good degree of dispersion amongst the nanoparticles and to ensure that the dispersion is uniform within the sample.

Given the fact that the form factor L/l may correspond to four different ratios as specified above (ratios a, b, c, or d), the term "form factor" should be understood in the meaning of the present invention as the mean form factor of mineral nanoparticles as measured using at least one of the ratios a to d, and preferably at least two of those ratios, more preferably at least three of those ratios, and still more preferably, all four ratios.

The form factor of mineral nanoparticles of the present invention may advantageously be greater than or equal to 1.5, preferably greater than or equal to 2, preferably greater than or equal to 5, preferably greater than or equal to 10, preferably greater than or equal to 50, and preferably greater than or equal to 100, in particular greater than or equal to 200. The form factor of mineral nanoparticles in the present invention is generally less than or equal to 10,000, preferably less than or equal to 5000, in particular less than or equal to 1000.

Concerning the second polymer of the invention, it may be selected from homopolymers of styrene, acrylate, acrylamide, and mixtures thereof.

Preferred acrylate homopolymers are polymethyl methacrylate (PMMA), butyl polyacrylate, and 2-hydroxyethyl polymethacrylate.

The second polymer may also be selected from copolymers of styrene, acrylate, acrylamide, and polycarbonate monomer, and mixtures thereof.

As examples of copolymers, mention may be made of copolymers of styrene and acrylonitrile (SAN), copolymers of methyl methacrylate, copolymers of butyl acrylate, and copolymers of bisphenol A.

The mineral nanoparticles mentioned throughout the present description are typically of nanometric ($10^{-9}$ m) size in at least one of their dimensions.

The term "dimension" is used herein to mean the number average dimension of all of the nanoparticles of a given population, this dimension being determined conventionally by methods that are well known to the person skilled in the art.

By way of example, the dimensions of nanoparticles of the invention may be determined by the following methods:
- the method of settling by centrifuging and X-ray analysis (method 1);
- the method of diffusing light by laser granulometry (method 2);
- the method of diffracting light by laser granulometry (method 3); and
- the electron microscope method (method 4), in particular using SEM or TEM.

In method 1, the dimension of the nanoparticles makes reference to the Stokes diameter. Thus, the dimension of a nanoparticle is taken to be the diameter of the sphere that has the same density and that on falling under laminar conditions through the same fluid, would have the same speed as said nanoparticles.

According to method 2, the dimension of the nanoparticles makes reference to the diffusion diameter. Thus, the dimension of a nanoparticle is taken to be the diameter of a sphere having a refractive index equal to that diffuses the same quantity of light as said nanoparticle in the same solid angle. Nevertheless, depending on the nature of the nanoparticles, it is sometimes necessary to apply Mie theory, well known to the person skilled in the art, in order to determine the refractive index of the nanoparticles. By way of example, the refractive index of calcium carbonate nanoparticles is not equal to 1.55, but is equal to 1.59 (real part) with an absorption coefficient of 0.020 to 0.022 (imaginary part), in application of Mie theory.

In method 3, the dimension of nanoparticles makes reference so the refraction diameter. Thus, the dimension of a nanoparticle is taken to be the diameter of the circle that gives rise to the same deflection of the beam as said nanoparticle, given the wave of nature of light, radiation.

In method 4, the dimension of the nanoparticles makes reference to the width l of the nanoparticles defined as being the shortest dimension of the nanoparticles. Thus, the dimension of a nanoparticle is taken to be the width l measured using image analysis techniques as described above in order to determine the form factor. This method of this determination is preferred for nanoparticles that have a form factor that is large, in particular greater than 100, for example lying in the range 200 to 1000.

The four methods of determining the dimension of the nanoparticles (methods 1, 2, 3, or 4) may lead to results that are significantly different. As a result, the results obtained must satisfy the condition whereby the nanometric size dimensions of the nanoparticles of the invention according to at least one of these methods 1 to 4, and preferably according to at least two of these methods, more preferably according to at least three of these methods, and most preferably according so all our methods.

The dimension of the mineral nanoparticles of the invention is in particular at most 400 nanometers preferably at most 300 nm, and more preferably at most 100 nm.

In particularly preferred manner, the dimension of the mineral nanoparticles is at least 1 nm, and not more than 80 nm, and more preferably is at least 10 nm and not more than 70 nm, e.g. being equal to 40 nm.

Advantageously, the mineral nanoparticles of the present invention may, prior to being mixed in the polymer matrix, be subjected in particular to a so-called "surface" treatment in order to improve their dispersion within said mixture, and thus limits their aggregation.

Any type, of surface treatment well known to the person skilled in the art may be envisaged, such as for example functionalizing or grafting said mineral nanoparticles.

Thus, when the mineral nanoparticles having a form factor strictly greater than 1.0 have been subjected to surface treatment, it is the mineral nanoparticles that have been treated in this way that are mixed (step i) in the polymer matrix in the molten state in accordance with the present invention.

In addition, the form factor of the mineral nanoparticles may advantageously be determined after said surface treatment. The form factor as calculated after surface treatment is substantially identical to that as calculated before said treatment.

The mineral nanoparticles having a form factor strictly greater than 1.0 according to the present invention may be selected from:
- nanoparticles of carbonates of alkaline-earth metals, such as for example nanoparticles of calcium carbonate;
- nanoparticles of phyllosilicates, such as for example nanoparticles of montmorillonite; and
- nanoparticles of metal oxides, such as for example nanoparticles of alumina or of alumina polymorph such as boehmite.

In order to improve the mechanical properties of the transparent polymer material while guaranteeing that it has satisfactory optical properties, in particular in the optical range, the mixture of step it of the invention includes a quantity at most 2% by weight of mineral nanoparticles having a form factor strictly greater than 1.0, preferably at most 1% by weight of said mineral nanoparticles, and still more preferably at most 0.5% by weight of said mineral nanoparticles. The particularly preferred example is a mixture (step i) having a quantity of 0.25% by weight of said mineral nanoparticles.

The mixture of step i) of the present invention may optionally include other types of nanoparticle, in particular mineral nanoparticles having a form factor equal to 1.

The mineral nanoparticles having a form factor equal to 1 may be nanoparticles selected from:
- nanoparticles of carbonates of alkaline-earth metals, such as for example nanoparticles of calcium carbonate;
- nanoparticles of sulfates of alkaline-earth metals, such as for example nanoparticles of barium sulfate;
- nanoparticles of metallic oxides, such as for example nanoparticles of alumina, of zinc oxide, or of titanium oxide;
- nanoparticles of metalloid oxides, such as for example nanoparticles of silicon dioxide; and
- nanoparticles of siloxanes, such as for example nanoparticles of silsesquioxanes, and more particularly nanoparticles of trisilanolphenyl polyhedral silsesquioxane (TP-POSS).

Depending on their grade, certain nanoparticles may have a form factor equal to 1.0 or strictly greater than 1.0. Calcium carbonate may be mentioned as an example. The nanoparticles of calcium carbonate sold by the supplier Solvay under the reference Socal® 31 are of cubic shape with a form factor equal to 1.0, whereas the nanoparticles of calcium carbonate sold by the supplier Solvay under the reference Socal® 901 exist in the form of needles and consequently have a form factor that is strictly greater than 1.0.

The quantity of all of the mineral nanoparticles in the mixture of step i) of the invention, or in other words of the mineral nanoparticles having a form factor greater than or equal to 1, is preferably at most 10% by weight, and preferably at most 5% by weight.

Thus, this upper limit serves in particular to limit the phenomenon of nanoparticles aggregating while they are being mixed in the polymer matrix, thereby guaranteeing that said nanoparticles are dispersed uniformly throughout said matrix and maintaining transparency better.

In order to limit, the degradation of the polymer matrix in the presence of mineral nanoparticles, and thus further improve mechanical properties while conserving optical properties, in particular when the quantity of mineral nanoparticles is greater than 0.5% by weight in the mixture of said step i), said mixture may further include at least one antioxidant, the or each antioxidant being at least partially soluble in the polymer matrix.

In a particular embodiment, the antioxidant(s) is/are mixed in the polymer matrix before adding the mineral nanoparticles. Preferably, the polymer matrix is initially melted (step ii) in the presence of the antioxidant(s), and then the mineral nanoparticles having a form factor strictly greater than 1.0 are mixed in said matrix (step i).

Advantageously, the mixture of step i) may include a quantity of at most 5% by weight of antioxidant, and preferably a quantity of at most 2% by weight of antioxidant. At a quantity of more than 5% by weight of antioxidant in said mixture, she resulting transparent polymer material may have its optical mechanical properties degraded.

The antioxidant(s) of the invention may be of any type of antioxidant well known to the person skilled in the art. Preferably, the antioxidant used includes a phosphite. By way of example, mention may be made of the following antioxidants: Ultranox® 626, Irgafos® 168, or Irganox® HP2921.

The transparent polymer material obtained by the preparation method of the present invention may advantageously be used for fabricating optical articles of the optical lens type for viewing instrumentation, a helmet visor, or an ophthalmic lens, or indeed articles of the automobile glass type.

By way of example, the thickness of the optical articles may be at most 15 millimeters (mm), preferably at least 0.1 mm, and at most 5 mm, and most preferably at least 0.5 mm and at most 4 mm.

Typically, the optical article may be fabricated from said transparent polymer material by any forming method well known to the person skilled in the art, such as thermoforming, draping, extrusion, calendering, spinning, injection, injection-compression, or blow-molding.

Preferably, the transparent polymer material of the invention is extruded in the form of a rod, said rod subsequently being granulated so as to be subjected to subsequent forming using at least one of the above-mentioned forming methods, in particular injection-molding or thermo-compression, required for fabricating said optical article.

DETAILED DESCRIPTION

Other characteristics and advantages of the present invention appear in the light of the following examples, which examples are given by way of non-limiting illustration.

EXAMPLES

The origins of the various constituents used in the examples that follow are as follows:
the polycarbonate (PC) first thermoplastic polymer is a polycarbonate (PC) sold by the supplier Bayer AG under the reference Makrolon® A12647;
the second thermoplastic polymer is a polymethyl methacrylate (PMMA) sold by the supplier Sigma-Aldrich. Co. under the reference 200336; and
the mineral nanoparticles having a form factor strictly greater than 1.0 are sold by the supplier Southern Clay Product Inc. under the reference Cloisite® 20A (C20A) or Cloisite® 30B (C30B).

These mineral nanoparticles are of the lamellar type. Their size is determined by MET with magnification of 40,000 on at least a score of images after initially dispersing the nanoparticles in ethanol, and then placing them on a copper grid, and finally covering them in a transparent amorphous polymer film. This produces a width l, or number average dimension that is approximately equal to 1 nm, and a length L lying in the range 200 nm to 1000 nm. Thus, as a result of MET analysis and direct measurements (ratio d), the form factor L/l of these nanoparticles lies in the range 200 to 1000.

Preparation of Polymer Materials

The first and second thermoplastic polymers and the nanoparticles having a form factor strictly greater than 1.0 were initially inserted into a conventional, container in order to be mixed together (step i) in the solid state using the proportions as set out in Table 1 below, the proportions of each of said constituents being determined by weighing.

Thereafter, the mixture of three constituents in the solid state (first polymer, second polymer, and mineral nanoparticles having a form factor strictly greater than 1.0) was inserted into an extruder in order to heat the mixed polymer matrix to the molten state (step ii). Said extruder may be of the recirculating two-screw type having the reference DSM micro 15 and sold by the supplier DSP Xplore, presenting a shear rate of 40 revolutions per minute. Nanoparticle mixing (step i) was consequently performed prior to the step of heating the polymer matrix to the molten state (step ii).

The temperature in the extruder was set so as to cause the polymer matrix of the mixture to melt, the extrusion temperature being higher than the vitreous transition temperature or the softening temperature of the polycarbonate first thermoplastic polymer. In addition, that temperature should preferably be set so as to limit temperature degradation of the polycarbonate first thermoplastic polymer. For example, the temperature in the extruder was set to 260° C.

Mixing was performed for a duration that was sufficient firstly to obtain a good dispersion of mineral nanoparticles in the mixture, and secondly to limit high temperature degradation of the first thermoplastic polymer. In the examples, the optimum duration used for the residence time of the first thermoplastic polymer in the molten state in the mixture was 14 minutes (min), however that duration is not limiting in any way and could lie in the range 7 min to 20 min Naturally, other methods of preparation could be envisaged. For example, it is possible to incorporate the mineral nanoparticles having a form factor strictly greater than 1.0 in the polymer matrix when already in the molten state. After mixing the polymer matrix in the molten state, e.g. for 3 min, said nanoparticles may be incorporated directly in the molten polymer matrix via the feed hopper of an extruder, with the resulting mixture flowing through the extrusion chamber for a sufficient duration, e.g. 11 min. The mixing of nanoparticles (step i) is consequently performed after the step of heating the polymer matrix to the molten state (step ii), this implementation being preferred.

It is also possible to envisage mixing together all three constituents of the invention at a temperature that enables the polymer matrix to be worked using an extruder. Consequently, the nanoparticles are mixed (step i) at the same time as the step of heating the polymer matrix to the molten state (step ii).

At the end of mixing, the polymer material is obtained that is to be shaped as a rod at the outlet from the extruder. Said rod is subsequently cooled and put into the form of granules.

In order to study the mechanical and optical properties of polymer materials of the present invention, said granules were subjected to transformation appropriate for making samples for determining said properties.

Mechanical and Optical Properties

The mechanical properties studied were the linear coefficient of thermal expansion and the bending modulus, and the optical properties studied were light transmission.

Linear Coefficient of Thermal Expansion (LCTE)

The LCTE characterizes the dimensional stability of the polymer material with varying temperature. This coefficient should preferably be as small as possible in order to limit the thermal expansion of the polymer material. This property is very important, particularly in the automobile glass application.

Measurements of LCTE were performed on samples in the form of bars having dimensions of 4 mm×50 mm×1.5 mm by thermal mechanical analysis using a VA4000 visco-analyzer sold by the supplier Metravib. The uncertainties in the LCTE measurements obtained were $0.5 \times 10^{-6}/°C$.

The bars were obtained from granules of polymer materials shaped using a hot plate hydraulic thermo-compression press under the trademark Darragon.

To measure LCTE, the sample was placed between two jaws. The upper jaw, secured to the measurement column, records the movement associated with variations of the length of the sample. A first temperature rise from ambient temperature to 100° C. was initially applied to the sample at a rate of 5° C./min. The sample was subsequently cooled to ambient temperature at a rate of 5° C./min. Finally, the measurement was performed while applying a temperature rise at a rate of 5° C./min from ambient temperature to 90° C.

Bending Modulus

The bending modulus characterizes the stiffness of the polymer material. The higher the bending modulus, the greater the stiffness of said material.

Bending modulus measurements were performed on samples in the form of bars having the dimensions: 4 mm×50 mm×1.5 mm.

The bars were obtained from granules of polymer materials shaped using a hot plate hydraulic thermo-compression press under the trademark Darragon. The bending moduluses of said bars were determined using a VA4000 visco-analyzer sold by the supplier Metravib.

The sample was raised to a temperature of 30° C. at a rate of 3° C./min. Modulus measurement was performed on a temperature plateau at 30° C. for 10 min. The frequency of the oscillation that was applied was 1 hertz (Hz) and the dynamic movement (amplitude of the oscillations) was 5 micrometers (µm).

Light Transmission

Light transmission characterizes the transparency of the polymer material. The higher the light transmission, the better the transparency of said material.

Light transmission measurements were performed at a wavelength of 650 nm on samples in the form of bars hang dimensions: 4 mm×50 mm×1.5 mm using a Cary 50 spectrometer sold by the supplier Varian.

The bars were obtained from granules of polymer materials shaped using a hot plate hydraulic thermo-compression press under the trademark Darragon.

The results obtained are summarized in Table 1 below. Comparative examples are referenced Cx. It should be observed that the quantities of PC and of PMMA are expressed in parts by weight relative to 100 parts by weight of polymers (pcr). The quantity of mineral nanoparticles having a form factor strictly greater than 1.0 in the mixture of step i) is expressed as a weight percentage (%). In addition, light transmission is expressed as a percentage relative to reference sample 0 that contained PC only, using the following equation:

$$\frac{\text{transmission of a sample}}{\text{transmission of reference sample 0}} \times 100$$

TABLE 1

| Polymer material sample | Polymer matrix | | Nanoparticles | | LCTE $(10^{-6}/°C.)$ | Light transmission (% relative to sample 0) | Bending modulus (GPa) |
|---|---|---|---|---|---|---|---|
| | PC (par) | PMMA (par) | C20A (%) | C30B (%) | | | |
| C1 | 100 | 0 | 0 | 0 | 73 | 100 | 2.42 |
| C2 | 100 | 0 | 0.25 | 0 | 64 | 81 | 2.51 |
| C3 | 100 | 0 | 0 | 0.25 | 66 | 86 | 2.62 |
| C4 | 95 | 5 | 0 | 0 | 71 | 100 | 2.49 |
| 5 | 95 | 5 | 0.25 | 0 | 62 | 86 | 2.87 |
| 6 | 95 | 5 | 0 | 0.25 | 64 | 99 | 3.47 |

Table 1 shows the synergy between the presence of a second transparent thermoplastic polymer other than polycarbonate, in particular PMMA, and adding nanoparticles having a form factor strictly greater than 1 (0.25% of C20A (sample 5) or of C30B (sample 6)).

Samples 5 and 6 made in accordance with the present invention thus present excellent light transmission for a bending modulus that is much greater than that obtained for samples C1 to C4.

Thermal expansion is also advantageously limited in the samples in accordance with the invention as a result of the reduction in LCTE.

The invention claimed is:

1. A method of preparing a transparent polymer material, said method comprising the steps of, in any order:
   i) mixing:
      mineral nanoparticles having a form factor strictly greater than 1.0; and
      a polymer matrix comprising a quantity of at least 80% by weight of a polycarbonate (PC) first thermoplastic polymer and of a second transparent thermoplastic polymer other than the first thermoplastic polymer;
   in order to obtain a mixture; and
   ii) heating the polymer matrix to the molten state, on its own or in the mixture;
   in order to obtain the transparent polymer material, the mixture of step i) comprising a quantity of mineral nanoparticles having a form factor strictly greater than 1.0 that is strictly less than 5% by weight, and step i) not involving mineral nanoparticles in the form of a premixture obtained with a thermoplastic polymer in the molten state selected from the group consisting of polycarbonate (PC), polystyrene (PS), and polymethyl methacrylate (PMMA).

2. A method according to claim 1, wherein the polymer matrix includes at least 90% by weight of the polycarbonate first thermoplastic polymer.

3. A method according to claim 1, wherein the form factor is greater than or equal to 2.

4. A method according to claim 1, wherein the second polymer is selected from the consisting of homopolymers of styrene, of acrylate, and of acrylamide, and a mixture thereof.

5. A method according to claim 1, wherein the second polymer is selected from the group consisting of copolymers of styrene, of acrylate, of acrylamide, and of polycarbonate monomer, and a mixture thereof.

6. A method according to claim 1, wherein the mineral nanoparticles having a form factor strictly greater than 1.0 are selected from the group consisting of nanoparticles of carbonates of alkaline earth metals, of phyllosilicates, and of metallic oxides.

7. A method according to claim 1, wherein the mineral nanoparticles having a form factor strictly greater than 1.0 are selected from the group consisting of nanoparticles of calcium carbonate, of montmorillonite, of alumina, and of boehmite.

8. A method according to claim 1, wherein the mixture of step i) includes a quantity of at most 2% by weight of mineral nanoparticles having a form factor strictly greater than 1.0.

9. A method according to claim 1, wherein the mixture of step i) further comprises mineral nanoparticles having a form factor equal to 1.

10. A method according to claim 9, wherein the mineral nanoparticles having a form factor equal to 1 are selected from the group consisting of nanoparticles of carbonates of alkaline-earth metals, of sulfates of alkaline-earth metals, of metallic oxides, of metalloid oxides, and of siloxanes.

11. A method according to claim 9, wherein the mixture of step i) comprises a quantity of at most 10% by weight mineral nanoparticles.

12. A method according to claim 1, wherein the size of the mineral nanoparticles is at most 300 nm.

13. A method according to claim 1, the mixture of step i) further includes at least one antioxidant.

14. A method according to claim 13, wherein the mixture of step i) includes a quantity of at most 5% by weight antioxidant.

15. A method according to claim 13, wherein the antioxidant comprises a phosphite.

16. A method according to claim 2, wherein the polymer matrix includes at least 95% by weight of the polycarbonate first thermoplastic polymer.

17. A method according to claim 3, wherein the form factor is greater than or equal to 5.

18. A method according to claim 17 wherein the form factor is greater than or equal to 10.

19. A method according to claim 18, wherein the form factor is greater than or equal to 50.

20. A method according to claim 19, wherein the form factor is greater than or equal to 100.

21. A method according to claim 20, wherein the form factor is greater than or equal to 200.

22. A method according to claim 8, wherein the mixture of step i) includes a quantity of at most 1% by weight of mineral nanoparticles having a form factor strictly greater than 1.0.

23. A method according to claim 22, wherein the mixture of step i) includes a quantity of at most 0.5% by weight of mineral nanoparticles having a form factor strictly greater than 1.0.

24. A method according to claim 12, wherein the size of the mineral nanoparticles is at most 100 nm.

25. A method according to claim 24, wherein the size of the mineral nanoparticles is at least 10 nm, and at most 70 nm.

26. A method according to claim 14, wherein the mixture of step i) includes a quantity of at most 2% by weight antioxidant.

* * * * *

UNITED STATES PATENT AND TRADEMARK OFFICE
CERTIFICATE OF CORRECTION

PATENT NO. : 8,278,382 B2
APPLICATION NO. : 13/130677
DATED : October 2, 2012
INVENTOR(S) : Boucher et al.

It is certified that error appears in the above-identified patent and that said Letters Patent is hereby corrected as shown below:

Col. 11, Claim 4, Line 12 - between "the" and "consisting", insert -- group --.

Signed and Sealed this
Nineteenth Day of March, 2013

Teresa Stanek Rea
*Acting Director of the United States Patent and Trademark Office*